July 25, 1939.　　　R. E. HENDRICKSON　　　2,167,071

WELL SURVEYING INSTRUMENT

Filed Aug. 3, 1937

Inventor

RALPH E. HENDRICKSON

By Lloyd Spencer

Attorney

Patented July 25, 1939

2,167,071

UNITED STATES PATENT OFFICE 2,167,071

WELL SURVEYING INSTRUMENT

Ralph E. Hendrickson, Fullerton, Calif., assignor to Lane-Wells Company, Los Angeles, Calif., a corporation of Delaware Application August 3, 1937, Serial No. 157,180

16 Claims. (Cl. 33—205.5)

My invention relates to well surveying instruments, and among the objects of my invention are:

First, to provide a well surveying instrument which employs a pair of coacting plumb bobs or inclination indicating means, one of which upstands and the other of which depends from its support, whereby the two plumb bobs or inclinometers incline in opposite directions, with respect to the axis of the well surveying instrument;

Second, to provide a dual inclination indicating means wherein two different but related scales may be employed, and so arranged that for slight angles of inclination the larger or more accurate scales may be employed, whereas for large angles of inclination the smaller scale is available;

Third, to provide a dual inclination indicating means wherein the inclination indicating elements are at all times diametrically opposite from each other and define points through which a line may be projected to determine the direction of inclination;

Fourth, to provide a well instrument of this character wherein images of the two inclination elements may be photographed, with respect to a common background, preferably bearing orientation indicia such as a compass image whereby the center of the compass image may be employed as a third point to check the accuracy of the two inclination element images.

Fifth, to provide a well surveying instrument which is applicable to either single shot or multiple record type of recording; and Sixth, to provide a well surveying instrument which, by reason of the dual inclination indicating means and the dual scale therein provided, is inherently suited for installation in casings or shells of extremely small diameter without sacrificing accuracy or range of inclination.

With the foregoing and other objects in view as may appear hereinafter, reference is made to the accompanying drawing, in which.

Figure 1:
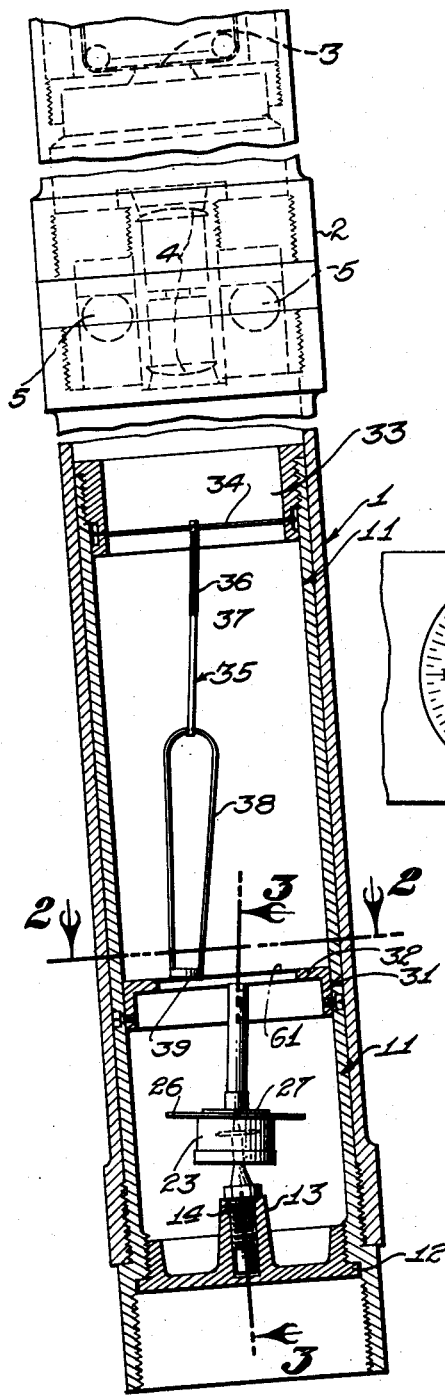
Figure 1 is a longitudinal sectional view of a well surveying instrument embodying my invention, certain parts non-essential to understanding of my invention being omitted or indicated by dotted outline to facilitate the illustration.
Figure 2:
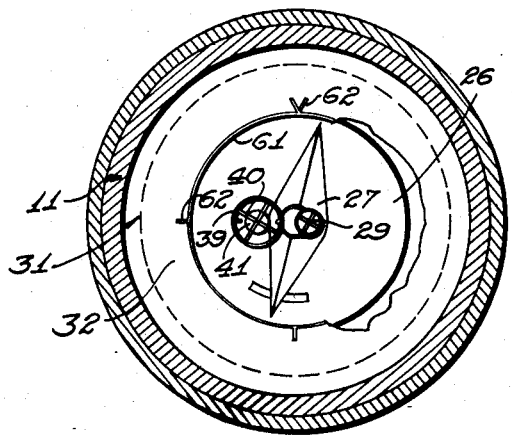
Figure 2 is an enlarged transverse sectional view through 2—2 of Figure 1, showing particularly the arrangement of the dual inclination means with respect to the compass needle.

My invention is preferably arranged as a unit which may be fitted within a shell 1 which depends from a suitable recording unit 2. Such unit may employ a multiple record film 3, a lens structure 4 for focusing the inclination and compass means thereon and a source of light 5 arranged so that the inclination and compass means may be illuminated. These elements form no part of the present invention, except as they are necessary to record the inclination obtained with my instrument.

My instrument is contained within a tube 11 screw-threaded for connection with the shell 1 and adapted to fit snugly therein. Near its lower end the shell 11 is closed by a base member 12 having an upwardly directed centered boss 13 which is internally threaded to receive the threaded shank of a compass pedestal 14. The pedestal 14 is provided with an axial bore which receives a compass supporting pin 15 having a protruding and pointed upper end 16 and a lower enlarged end 17 adapted to be engaged by a spring 18 for yieldably supporting and cushioning the pin 15. The pin 15 and spring 18 are assembled through the lower end of the pedestal 14, which end is adapted to be closed by a screw plug 19.

A deck plate 20 is provided, having a central boss 21, the under side of which is conical and is provided with a jewel bearing 22 adapted to rest upon the point 16 of the pin 15, so that the deck plate is both pivotal and tiltable with respect to the pin 15. The periphery of the deck plate 20 is screw-threaded for connection with an annular depending skirt 23. The skirt 23 is provided with a constriction 24 defined by downwardly and upwardly converging conical walls. The skirt 23 is relatively heavy so that the center or gravity is substantially below the bearing point between pin 16 and bearing 22. The upper end of the pedestal 14 is provided with a keeper flange 25 which is slightly larger than the constriction 24 so that the skirt cannot be withdrawn upwardly therefrom. The flange 25, however, does not engage the skirt 23 as long as the bearing 22 rests on the pin 16 and is so arranged that the skirt may tilt a material amount before there is any contact with the pedestal 14 or its flange 25. Should the deck plate be shaken excessively, or the pedestal turned upside down, the bearing 22 and point 16 cannot be materially displaced so that upon the deck plate assuming its normal position the bearing 22 automatically assumes its proper position on the pin 16.

The deck plate 20 receives a circular compass card 26 upon which is printed, or otherwise suitably formed, compass indicia. Upon the compass card is fitted a compass element 27 in the form of a diamond-shaped plate of magnetic material.

The compass card and compass element may be secured in place by an upstanding inclinometer tube 28 threaded at its lower end to fit the boss 21. The tube 28 is preferably formed of extremely light material and is open at its upper end. Immediately within its upper end the tube 28 is provided with a pair of fine cross hairs 29. The mass of the skirt 23 is such that, notwithstanding the tube 28, the center of gravity is below the bearing 22, with the result that the compass card tends to maintain a horizontal position and the inclinometer tube 28 tends to occupy a vertical position.

Within the tube 11, near the upper extremity of the tube 28, there is mounted a ring 31 having an interval flange 32. The aperture defined by the flange 32 determines the area of the compass card which may be photographed, or at least delineates the margins of the photographic record.

The upper end of the tube 11 receives a threaded bushing 33 which carries a pair of diametrically extending supporting wires 34. The supporting wires 34 support a plumb bob 35 comprising an upper section of chain links 36, an intermediate stem portion 37 and a U shaped wire yoke 38 having tapering depending legs which are secured into a plumb bob base 39. The plumb base 39 comprises a short cylindrical section supporting a pair of fine cross hairs 40 below the intersection of which is positioned a small shield disc 41.

The length of the yoke 38 is so proportioned that the stem 37 and chain 36, as well as the supporting hairs 34, are out of focus and do not interfere with photographing the cross hairs 40 of the plumb bob 35. Also, the various parts of the plumb bob 35 are so proportioned that the instrument may be tilted in any position without causing the plumb bob to tangle and fail to return to its normal position when the instrument is in its operative position.

Figures 4, 5:
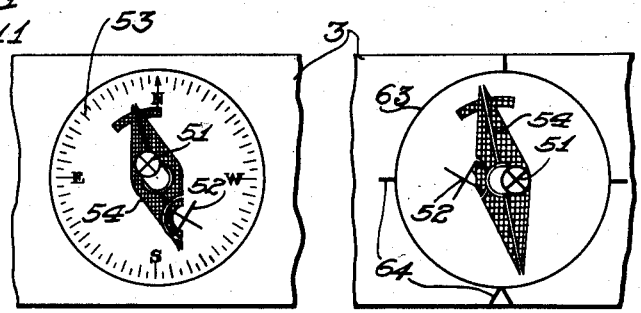
Figure 4 illustrates one type of photographic record obtainable with my invention.
Figure 5 illustrates another type of photographic record.
Figure 3:
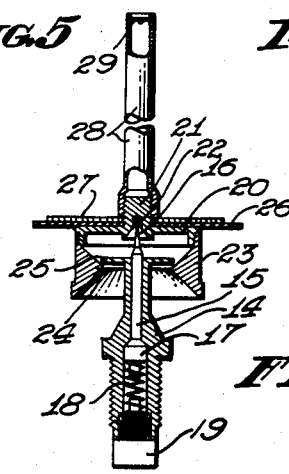
Figure 3 is an enlarged longitudinal sectional view through the compass support and upstanding inclination indicating element.

The operation of my well surveying instrument is as follows: All parts which are desired to appear on the record as black are painted white; consequently the compass element 27, whatever indicia is desired on the compass card and the cross hairs 29 and 40 are painted white; the disc 41, the interior of the tube 28, as well as the tube 11, are painted black. If the instrument is incorporated with a multiple shot recording unit, the film 3 is advanced periodically and the light 5 is turned on at predetermined intervals so that a series of photographs showing the compass card, the compass and plumb bob are reproduced on the film 3. These may appear as shown in Figures 4 or 5. It will be noted that the upstanding inclinometer carried by the compass and having the cross hairs 29 is at all times diametrically opposite from the plumb bob 35. Thus, a line drawn through the images 51 and 52 of cross hairs 29 and 40, respectively, pass through the center of the compass card image 53. Comparison of such a line with the axis of the compass element image 54 determines the direction of inclination. By reason of the fact that the two inclinometers tilt relatively in diametrically opposite directions provide three instead of two points to determine the direction of inclination, thus permitting the record to be interpreted with greater accuracy. Also, it should be noted that the distance between the cross hair images 51 and 52 is greater than any mere radial distance, so that the diametrical line therethrough may be plotted with greater accuracy for any given angle of inclination.

The distance between the cross hairs 29 and the bearing 22 is preferably an accurate sub-multiple of the distance between the cross hairs 40 and the supporting wires 34 so that for relatively small angles, the distance between cross hair image 52 and the center of the record may be employed to determine the amount of inclination, whereas should the angle be relatively great and perhaps the plumb bob 35 tilted out of range, the inclination may be measured by the distance between cross hair image 51 and the record center but, of course, on a smaller scale.

Thus, by reason of the dual inclinometer arrangement, it is not only possible to determine the direction of inclination more accurately, but also an instrument of a given diameter may have a greater range of operation, it being borne in mind that it is only necessary to maintain a certain percentage of accuracy; in other words, for small angles it may be desired to read within a fraction of a degree but for larger angles an inaccuracy of one degree or more is not serious.

It is sometimes desirable to survey within cased wells, which interferes with proper operation of a magnetic compass. In this event it is customary to orient from the surface by measuring rotation of the drill pipe, or other tubing upon which the surveying instrument is lowered. In such case, the direction of inclination is determined with respect to the shell 11 rather than the compass 27. This is done by providing a white ring 61, preferably painting a shallow groove bordering the inner periphery of the flange 32 which may be intersected by radial lines 62, also painted white, so that their images appear as the circle 63 and radial lines 64, as illustrated in Figure 4. When so employed, the compass image, as well as the compass point or direction indicia shown in Figure 5, may or may not appear, for, although not employed in such case, they do not interfere with interpretation of the record. In this case, it should be noted that the black interior of the tube 28, as well as the mask disc 41, blot out any background that might interfere with locating the cross hair intersection.

It should be noted that the planes of the two sets of cross hairs 29 and 40 are only slightly offset so that they are equally in focus. Furthermore, the length of the tube 28 is such, in comparison with the focal length of the recording unit, that the compass and compass card are likewise sufficiently focused.

Though I have shown and described a particular embodiment of my invention, I do not wish to be limited thereto but desire to include within the scope of my invention the constructions, combinations and arrangements substantially as embraced in the appended claims.

I claim:

1. In a well surveying instrument: a depending inclinometer; an upstanding inclinometer; said inclinometers having indicating ends contiguous to each other; and means for photographing a composite image of said indicating ends.

2. In a well surveying instrument: a pair of inclinometers having coaxial supports and indicating elements arranged above and below, respectively, of their supports and adapted to move in diametrically opposite directions with respect to said common axis; and means for photographing a composite image of said indicating elements.

3. In a well surveying instrument: a photographic recording means including a focusing lens; a depending and an upstanding inclinometer arranged coaxially below said lens and having their free ends contiguous and bearing point-determining indicia disposed substantially in the focus of said lens; said depending inclinometer having a skeletonal supporting framework substantially out of the focus of said lens and ineffective to obstruct the images of said indicia.

4. In a well surveying instrument: a photographic recording means including a focusing lens; a depending and an upstanding inclinometer arranged coaxially below said lens and having their free ends contiguous and bearing point-determining indicia disposed substantially in the focus of said lens; said depending inclinometer having a skeletonal supporting framework substantially out of the focus of said lens and ineffective to obstruct the images of said indicia; the lengths of said inclinometers bearing a predetermined relationship whereby, upon a given inclination of said common axis, said indicia are displaced a proportional distance therefrom.

5. In a well surveying instrument: a compass structure; an upstanding inclinometer carried thereby; and a depending plumb bob having a free end in proximity to the free end of said upstanding inclinometer.

6. In a well surveying instrument: a compass structure; an upstanding inclinometer carried thereby; a depending inclinometer having a free end in proximity to the free end of said upstanding inclinometer; a point-determining indicia at the free ends of said inclinometers; and photographic means for recording a composite image of said indicia on both inclinometers and said compass.

7. In a well surveying instrument: a compass structure; an upstanding inclinometer carried thereby; a depending inclinometer having a free end in proximity to the free end of said upstanding inclinometer; said inclinometers having a common axis through their points of support, and the lengths of said inclinometers bearing a predetermined relationship whereby, upon a given inclination of said common axis, said indicia are displaced a proportional distance therefrom.

8. In a well surveying instrument: a compass structure; an upstanding inclinometer carried thereby; a depending inclinometer having a free end in proximity to the free end of said upstanding inclinometer; a point-determining indicia at the free ends of said inclinometers; photographic means for recording a composite image of said indicia on both inclinometers and said compass; said inclinometers having a common axis through their points of support and the lengths of said inclinometers bearing a predetermined relationship whereby, upon a given inclination of said common axis, said indicia are displaced a proportional distance therefrom.

9. In a well surveying instrument: a compass element; a journal therefor; an upstanding inclinometer centered on said compass element; and counterbalance means depending from said compass element below its point of support tending to maintain said inclinometer vertical and said compass horizontal.

10. In a well surveying instrument: a compass element; a journal therefor; an upstanding inclinometer centered on said compass element; counterbalance means depending from said compass element below its point of support tending to maintain said inclinometer vertical and said compass horizontal; and means for photographing a composite image of said inclinometer and said compass element.

11. In a well surveying instrument: a compass element; a journal therefor; an upstanding inclinometer centered on said compass element; counterbalance means depending from said compass element below its point of support tending to maintain said inclinometer vertical and said compass horizontal; a second inclinometer depending from above the first inclinometer; a substantially light non-interfering suspension means for said second inclinometer; and photographic means above said suspension means adapted to record the composite images of said inclinometer and said compass element.

12. In a well surveying instrument: a shell; a photographic means directed axially into said shell; an internal flange in said shell forming a mask substantially delineating the photographic field in said shell; an inclinometer suspended from above said mask; an upstanding inclinometer below said mask; the free ends of said inclinometers bearing point-determining indicia and located contiguous to said mask; one of said inclinometers being longer than the other and adapted, upon tilting of said shell beyond a predetermined angle, to clear the photographic field.

13. In a well surveyng instrument: a shell; a photographic means directed axially into said shell; an internal flange in said shell forming a mask substantially delineating the photographic field in said shell; an inclinometer suspended from above said mask; an upstanding inclinometer below said mask; the free ends of said inclinometers bearing point-determining indicia and located contiguous to said mask; one of said inclinometers being longer than the other and adapted, upon tilting of said shell beyond a predetermined angle, to clear the photographic field; a compass supported horizontally in association with said first inclinometer; and a background card carred with said first inclinometer whereby, within said predetermined angle, both of said inclinometers occupy positions over said background card.

14. A well surveying instrument including an inclinometer, a second inclinometer, each inclinometer pvotally supporting an indicating element, said indicating elements being disposed contiguous to each other and adapted to move in diametrically opposite directions, and means for photographing a composite image of said indicating elements.

15. A well surveying instrument, including a pair of inclinometers having coaxial supports and indicating elements provided with point-determining indicia, said indicating elements being disposed contiguous to each other and adapted to move in diametrically opposite directions with respect to said common axis, and means for photographing a composite image of said indicating elements.

16. A well surveying instrument, a compass element, a pair of inclinometers having coaxial supports and indicating elements with point-determining indicia positioned contiguous to each other and said compass and adapted to move in diametrically opposite directions with respect to said common axis, and means for photographing a composite image of said indicating elements and said compass.

RALPH E. HENDRICKSON.

CERTIFICATE OF CORRECTION.

Patent No. 2,167,071.  July 25, 1939.

RALPH E. HENDRICKSON.

It is hereby certified that error appears in the printed specification of the above numbered patent requiring correction as follows: Page 1, second column, line 41, for the word "or" read of; page 2, first column, line 17, for "interval" read internal; page 3, second column, line 43, claim 13, for "carred" read carried; line 49, claim 14, for "pvotally" read pivotally; and that the said Letters Patent should be read with this correction therein that the same may conform to the record of the case in the Patent Office.

Signed and sealed this 19th day of December, A. D. 1939.

(Seal)

Henry Van Arsdale,
Acting Commissioner of Patents.